United States Patent
Concho et al.

(10) Patent No.: US 9,512,620 B2
(45) Date of Patent: *Dec. 6, 2016

(54) ACTIVE FIRE-BLOCKING WIND DEFLECTOR

(71) Applicant: SUNPOWER CORPORATION, San Jose, CA (US)

(72) Inventors: Christine Concho, San Francisco, CA (US); Michael Crockett, Berkeley, CA (US); Carl J. S. Lenox, Oakland, CA (US)

(73) Assignee: SUNPOWER CORPORATION, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/319,985

(22) Filed: Jun. 30, 2014

(65) Prior Publication Data

US 2014/0311054 A1 Oct. 23, 2014

Related U.S. Application Data

(63) Continuation of application No. 13/436,703, filed on Mar. 30, 2012, now Pat. No. 8,763,316.

(51) Int. Cl.
*E04H 9/14* (2006.01)
*E04D 13/00* (2006.01)
(Continued)

(52) U.S. Cl.
CPC .............. *E04D 13/00* (2013.01); *F24J 2/4609* (2013.01); *F24J 2/4638* (2013.01); *A62C 2/12* (2013.01);
(Continued)

(58) Field of Classification Search
CPC ......... E04D 13/00; F24J 2/4638; Y02B 10/20; Y02B 10/12
(Continued)

(56) References Cited

U.S. PATENT DOCUMENTS 3,968,841 A * 7/1976 Harmathy ........................ 169/48
4,005,557 A 2/1977 Kramer et al.
(Continued)

FOREIGN PATENT DOCUMENTS

AU 2002301823 B2 3/2003
GB 1 563 709 A 3/1980
(Continued)

OTHER PUBLICATIONS

International Search Report and Written Opinion received in International Patent Application No. PCT/US2012/069570, dated Apr. 24, 2013, filed on Dec. 13, 2012.

*Primary Examiner* — Patrick Maestri
(74) *Attorney, Agent, or Firm* — Knobbe, Martens, Olson & Bear LLP (57) ABSTRACT

A rooftop photovoltaic solar system is disclosed. The solar system comprises a plurality of photovoltaic modules forming a rooftop array, the rooftop array having at least one edge and a wind deflector positioned along the edge of the rooftop array, the wind deflector constrained in a first configuration by a fuse. In the first configuration the wind deflector comprises a deflecting portion adapted to deflect wind blowing on the rooftop above the rooftop array and a ventilation portion having a plurality of openings, the openings positioned to permit airflow under the rooftop array. The wind deflector assumes a second configuration upon release of the fuse. In the second configuration, the deflecting portion is elevated from the first configuration and the ventilation portion is positioned to permit less airflow through the plurality of openings than in the first configuration.

20 Claims, 9 Drawing Sheets

(51) Int. Cl.
*F24J 2/46* (2006.01)
*A62C 2/12* (2006.01)
*A62C 3/16* (2006.01)

(52) U.S. Cl.
CPC ................ *A62C 3/16* (2013.01); *Y02B 10/12* (2013.01); *Y02B 10/20* (2013.01); *Y02E 10/40* (2013.01)

(58) Field of Classification Search
USPC ............... 52/1, 84, 173.3, 232, 465; 169/42
See application file for complete search history.

(56) References Cited

U.S. PATENT DOCUMENTS

| | | |
|---|---|---|
| 5,746,839 A | 5/1998 | Dinwoodie |
| 5,953,869 A | 9/1999 | Balfour et al. |
| 6,155,006 A | 12/2000 | Mimura et al. |
| 6,495,750 B1 | 12/2002 | Dinwoodie |
| 6,501,013 B1 | 12/2002 | Dinwoodie |
| 6,959,517 B2 | 11/2005 | Poddany et al. |
| 6,959,520 B2 | 11/2005 | Hartman |
| 7,600,349 B2* | 10/2009 | Liebendorfer ......... F24J 2/5207 136/244 |
| 7,956,281 B2* | 6/2011 | O'Brien et al. ............... 136/251 |
| 8,763,316 B2 | 7/2014 | Concho et al. |
| 2003/0010374 A1* | 1/2003 | Dinwoodie ................. 136/251 |
| 2006/0118163 A1* | 6/2006 | Plaisted et al. ............... 136/251 |
| 2007/0199561 A1 | 8/2007 | Soucy |
| 2009/0031640 A1 | 2/2009 | Elmes et al. |
| 2009/0320906 A1* | 12/2009 | Botkin et al. ................. 136/251 |
| 2010/0313928 A1 | 12/2010 | Rose et al. |
| 2011/0232715 A1 | 9/2011 | Lenox et al. |
| 2012/0301661 A1* | 11/2012 | West ..................... F24J 2/5211 428/99 |

FOREIGN PATENT DOCUMENTS

| | | |
|---|---|---|
| WO | WO 2010/056464 A1 | 5/2010 |
| WO | WO 2011/119245 | 9/2011 |

* cited by examiner

ACTIVE FIRE-BLOCKING WIND DEFLECTOR

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

TECHNICAL FIELD

Embodiments of the subject matter described herein relate generally to wind deflectors for rooftop photovoltaic arrays. More particularly, embodiments of the subject matter relate to fire danger reduction for rooftop photovoltaic arrays.

BACKGROUND

Photovoltaic (PV) systems can be positioned on the rooftops of different types of buildings, such as commercial warehouses, residential homes, industrial buildings, office buildings, and so on. Any such structure is susceptible to fire. PV installations can be affected by fire from a burning building in several ways, including the collection of hot gases beneath them, or fire approaching them along the surface of the roof. It is desirable to reduce any harmful effects on the PV system.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

A wind deflector assembly for a photovoltaic solar system installed on a rooftop is disclosed. The wind deflector assembly comprises a planar portion oriented at an angle to a slope of the rooftop, a support portion beneath the planar portion, a compression portion connecting the planar portion and the support portion, the compression portion retained in a strain-loaded position, and a heat-releasing fuse maintaining the compression portion in the strain-loaded position.

A rooftop photovoltaic solar system is disclosed. The solar system comprises a plurality of photovoltaic modules forming a rooftop array, the rooftop array having at least one edge and a wind deflector positioned along the edge of the rooftop array, the wind deflector constrained in a first configuration by a fuse. In the first configuration the wind deflector comprises a deflecting portion adapted to deflect wind blowing on the rooftop above the rooftop array and a ventilation portion having a plurality of openings, the openings positioned to permit airflow under the rooftop array. The wind deflector assumes a second configuration upon release of the fuse. In the second configuration, the deflecting portion is elevated from the first configuration and the ventilation portion is positioned to permit less airflow through the plurality of openings than in the first configuration.

A wind deflector held in compression is also disclosed. The wind deflector comprises a planar portion, a support portion coupled to the planar portion, the planar portion held in a first position relative to the support portion, the first position causing strain in the wind deflector, and fuse means retaining the wind deflector in the first position, the fuse means adapted to release at a predetermined temperature, thereby releasing the wind deflector from compression and positioning the planar portion at a second position relative to the support portion.

Figure 9:
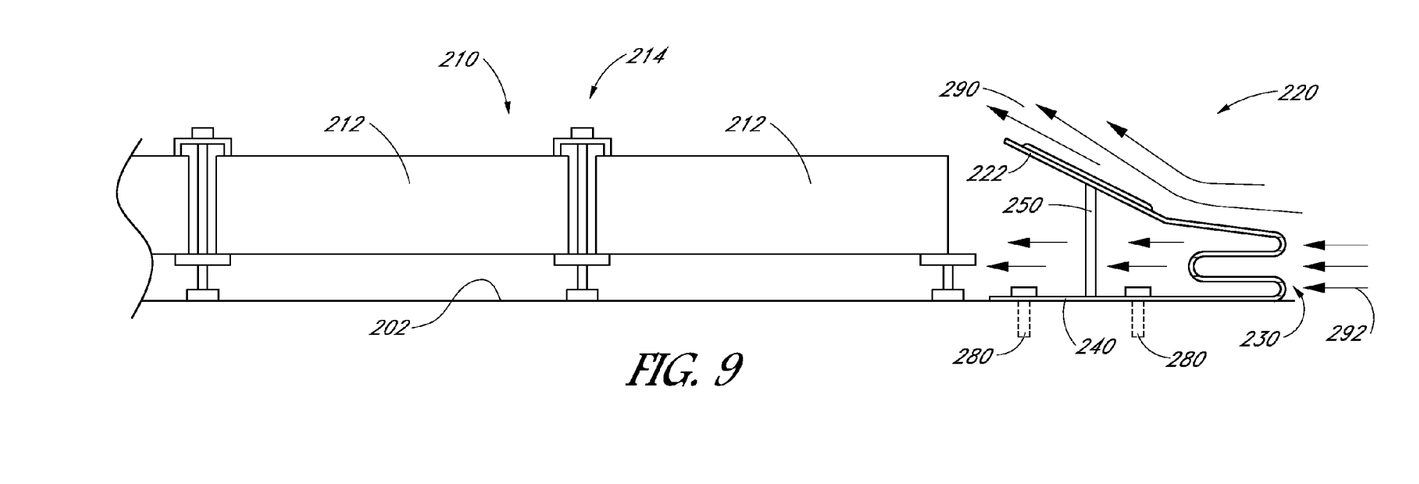
FIG. 9 is a side view of an embodiment of a wind deflector adjacent a rooftop PV array.

"Coupled"—The following description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the schematic shown in FIG. 9 depicts one exemplary arrangement of elements, additional intervening elements, devices, features, or components may be present in an embodiment of the depicted subject matter.

"Adjust"—Some elements, components, and/or features are described as being adjustable or adjusted. As used herein, unless expressly stated otherwise, "adjust" means to position, modify, alter, or dispose an element or component or portion thereof as suitable to the circumstance and embodiment. In certain cases, the element or component, or portion thereof, can remain in an unchanged position, state, and/or condition as a result of adjustment, if appropriate or desirable for the embodiment under the circumstances. In some cases, the element or component can be altered, changed, or modified to a new position, state, and/or condition as a result of adjustment, if appropriate or desired.

"Inhibit"—As used herein, inhibit is used to describe a reducing or minimizing effect. When a component or feature is described as inhibiting an action, motion, or condition it may completely prevent the result or outcome or future state completely. Additionally, "inhibit" can also refer to a reduction or lessening of the outcome, performance, and/or effect which might otherwise occur. Accordingly, when a component, element, or feature is referred to as inhibiting a result or state, it need not completely prevent or eliminate the result or state.

In addition, certain terminology may also be used in the following description for the purpose of reference only, and thus are not intended to be limiting. For example, terms such as "upper", "lower", "above", and "below" refer to directions in the drawings to which reference is made. Terms such as "front", "back", "rear", "side", "outboard", and "inboard" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second", and other such numerical terms referring to structures do not imply a sequence or order unless clearly indicated by the context.

One technique for mitigating fire damage to a building equipped with a rooftop photovoltaic (PV) system is to inhibit the exposure of the PV array to flames spreading laterally along the roof. Some rooftop installations of PV arrays offset the PV array atop the roof surface. Another technique for mitigating fire damage to the building and its PV array is to inhibit the flow of hot gases beneath the PV array.

Additionally, because rooftop PV systems are exposed to wind and normal environmental conditions for the majority of their lifetimes, it can be advantageous to use a fire-damage mitigation system which provides performance benefits during windy conditions, such as reducing lift on the PV array. One technique can be to provide equalization of pressure above and below the PV array. Another advantageous performance feature can be to deflect air upwards and over the upper surface of modules in the PV array, reducing drag on them and improving pressure equalization performance during windy conditions.

An active fire-resistance wind deflector is disclosed for use with rooftop PV arrays. The wind deflector is configured to remain in a compressed, first state following installation and normal conditions. In the first state, the wind deflector can redirect air above and over the upper surfaces of PV modules in the rooftop array with an upper deflecting surface. Additionally, the wind deflector can have openings or airflow ports arranged to permit wind to flow below both the deflecting surface and the PV array, thereby aiding pressure equalization above and below the PV array.

The wind deflector has a heat-activated fuse release mechanism. A trigger temperature can be selected for the fuse. The trigger temperature is above the temperature range the wind deflector experiences during its normal operating state. Preferably, the trigger temperature is sufficiently high so as to only be experienced by the heat-activated fuse during an actual fire on or near the rooftop.

Upon release of the heat-activated fuse, the wind deflector can release strain to move to an uncompressed, or un-loaded state. In this second state, the wind deflector can adjust the position of its upper deflecting surface upwards. This can inhibit the spread of flames onto the top of the PV modules from a rooftop level fire. This advantage affects not only rooftop level fires, but also those which climb the walls of the building and attempt to spread up a sloped roof, such as on a residential home.

Additionally, the release of compression can reduce the profile of the airflow ports. The reduced airflow through the ports can inhibit flow of hot gases into the space beneath the PV modules, further shielding them from the effects of fire. Thus, a single wind deflector having the features described herein can provide advantageous features during both normal operations and fire conditions.

Figure 1:
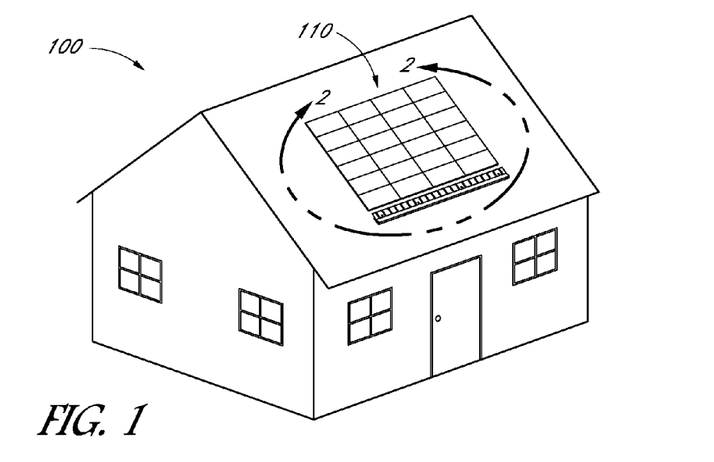
FIG. 1 is a residential house with a rooftop photovoltaic (PV) array and embodiment of a wind deflector.
Figure 2:
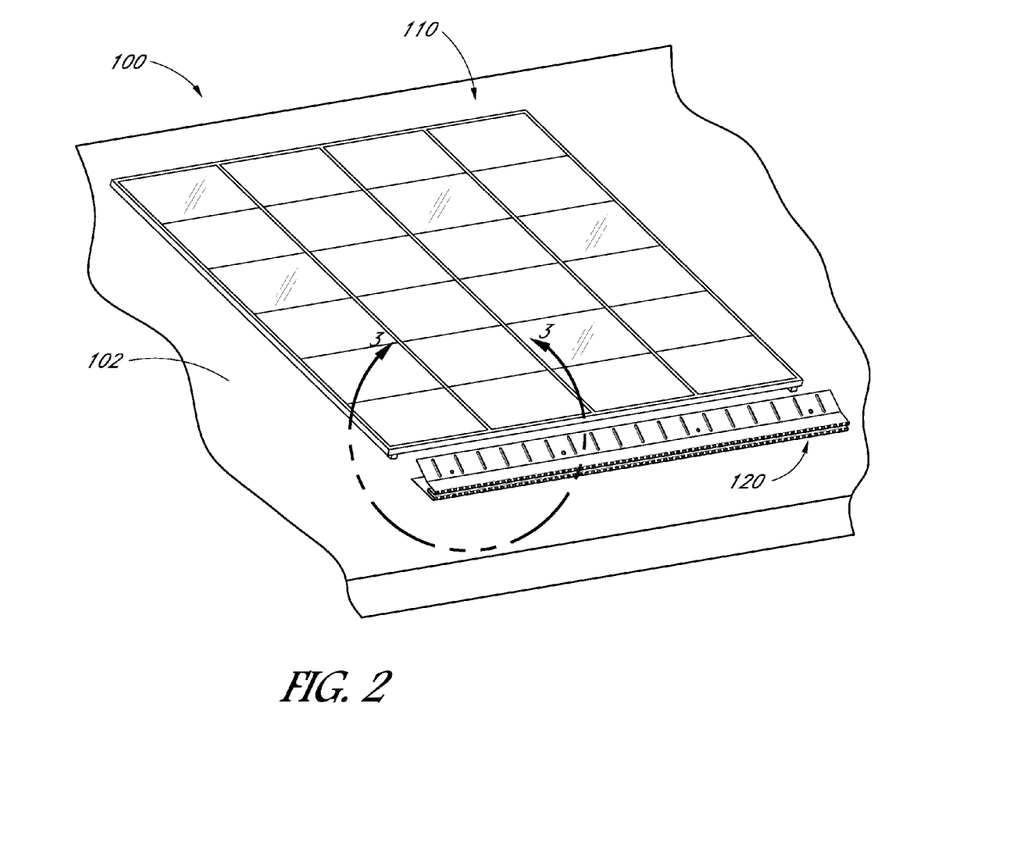
FIG. 2 is a detailed view of the rooftop PV array and wind deflector embodiment of FIG. 1.
Figure 3:
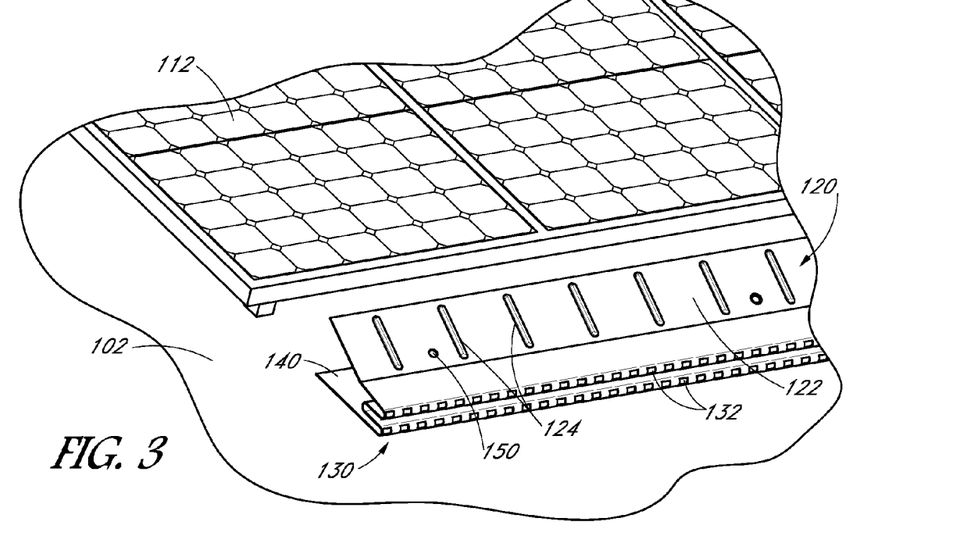
FIG. 3 is a detailed view of a corner of the rooftop PV array and an end of the deflector embodiment of FIG. 2.

FIG. 1 illustrates a residential home 100 with a rooftop PV array 110. FIG. 2 illustrates a detailed view of the roof 102 of the home 100 with PV array 110, and showing the adjacent wind deflector 120. FIG. 3 illustrates a detailed front perspective view of a PV module 112 of the PV array 110 atop the roof 102, with the wind deflector 120 positioned adjacent the PV array 110. Although the PV array 110 is illustrated atop a home with a sloped roof surface, the illustrated and other embodiments of the wind deflector 120 can be used with any type of roof-mounted PV array, such as on top of flat-roofed buildings, such as office buildings, warehouses, convention centers, museums, schools, as well as other types of sloped-roof buildings. The wind deflector 120 or an alternative embodiment can be used with any desired rooftop array.

With continued reference to FIGS. 1-3, and additional reference to FIGS. 4-7, the wind deflector 120 is described. The wind deflector 120 can comprise several sections or portions. In the illustrated embodiment, the wind deflector 120 has a planar, or mostly planar, upper deflection surface 122. The deflection surface 122 can be contiguous with, or coupled to, a compression or mid-section portion 130. In the illustrated embodiment, the compression portion 130 has several bends to accommodate compression of the wind deflector 120. The wind deflector 120 can also comprise a support or bottom portion 140. Finally, the wind deflector 120 can have one or more heat fuses 150. Although described herein as a single wind deflector 120, each wind deflector 120 can be referred to as a single unit element or a subcomponent of a longer wind deflecting assembly. For example, the wind deflector 120 shown in FIG. 2 adjacent the PV array 110 extends along substantially the entirety of the side of the PV array 110. This can be a single wind deflector 120 unit or a combination of several discrete units side-by-side having properties and features as described below.

In some embodiments, the deflection surface 122 can have surface features or a shape designed to adjust airflow over it, inducing turbulence or improving laminar flow of air across the top of the PV array 110, as desired. Additionally, the deflection surface 122 can comprise one or more stiffness members, such as the ribs 124. In some embodiments, the deflection surface 122 can have a fire-resistant coating 126 or thermal insulation layer applied to it. Other components of the wind deflector 120 can have the coating 126 applied, in addition to the entire wind deflector 120 being constructed from a non-flammable material, such as a metal or plastic.

Thus, although the coating 126 is shown in on a portion of the deflection surface 122, the entire deflection surface 122, the compression portion 130, and/or the bottom portion can all have the coating 126 or other thermally-resistive properties.

The compression portion 130 can be composed of several bends in the wind deflector 120. Thus, the deflection surface 122 and compression portion 130 can be integrally formed as a single piece or unit. For example, they can be a shaped or bent piece of sheet metal or flashing. The compression portion 130 can also be integrally-formed with the bottom portion 140. Thus, all three sections or portions can be formed as a single unit or piece of material with shaped curvature. In certain embodiments, the wind deflector 120 can be constructed from a plastic, such as by injection molding. Any appropriate material or construction technique can be used, provided the wind deflector 120 can perform the operations and has the features described herein.

The compression portion 130 can have a plurality of openings, ports, airflow vents 132, or other fluid transmissive gaps. The vents 132 can be positioned to permit air to flow through the compression portion 130 below the deflection surface 122. The airflow vents 132 can be at any desired height and present on or omitted from different surfaces of the compression portion 130 as desired to provide airflow to an adjacent PV array 110. Thus, the compression portion 130 can also be considered the ventilation portion as airflow is provided through the wind deflector 120 through this section.

The airflow vents 132 can be present along surfaces of the compression portion 130, including the recessed lobe 134. In various embodiments, the airflow vents 132 can have rectilinear, oval, circular, or other shapes, including meshes, elongated openings, and so on. Similarly, the airflow vents 132 can be present on some or other surfaces, and although shown along two front surfaces of the compression portion 130 and the recessed lobe 134, in some embodiments, the airflow vents 132 can be present on only the recessed lobe 134, only one or the other of the front surfaces of the compression portion 130, or any combination or permutation thereof. Additionally, depending on the shape of the compression portion 130, only a single surface may be available for airflow vents, or, in some embodiments, the airflow vents 132 can extend partially or be disposed entirely on the deflection surface 122.

One of the lobes of folds of the compression portion 130 can extend inward beneath the deflection surface 122. This recessed lobe 134 can additionally have one or more of the airflow vents 132. The recessed lobe 134 and other folds of the compression portion 130 can be flexible enough to elastically deform under load, so as to adjust the shape of the wind deflector 120 and position of the deflection surface 122.

As described above, the bottom portion 140 can be an extension of the material forming the wind deflector 120. Thus, the bottom portion 140 can be a part of the flashing or sheet material, such as sheet metal, that forms the wind deflector 120.

The bottom portion 140 can be flat and planar, thus enabling it to rest on the roof 102. In other embodiments, the bottom portion 140 can be coupled to surfaces other than the roof 102. The bottom portion 140 can form an angle with the deflection surface 122, causing deflection of air by the wind deflector 120.

The heat fuse 150 can be one or more of any number of heat-activated release mechanisms. For example, it can be a plastic member or metal member. In some embodiments, the heat fuse 150 can undergo structural failure in the presence of a trigger temperature. In the embodiment illustrated in FIGS. 4 and 5, the heat fuse 150 is shown separating to form broken fuse parts 152. This embodiment is illustrated throughout, although in some embodiments, the heat fuse 150 can comprise a metal with a melting point at the trigger temperature. In such embodiments, the heat fuse 150 can position the metal at a junction between segments of the heat fuse 150 and the segments can separate into broken fuse parts 152 as the metal melts. In some embodiments, the heat fuse 150 can be an active component which includes a thermocouple or other temperature sensor. An active heat fuse 150 can detect the trigger temperature in the surrounding environment and release the heat fuse 150. Other heat-sensitive release mechanism can be used as a heat fuse 150 without deviating from the teachings herein.

A wind deflector 120 can have a single heat fuse 150, or there can be several in each wind deflector 120. The heat fuse 150 can extend through the deflection surface 122 and bottom portion 140 and maintain its position through a flange portion. Thus, the upper surface of the deflection surface 122 can have a bevel or recess to receive the flange of the heat fuse 150. The bottom portion 140 can have a similar recess. In other embodiments, the heat fuse 150 can be affixed to the underside of the deflection surface 122 and upper side of the bottom portion 140. In some embodiments, the heat fuse 150 can be affixed by an adhesive or bond. In other embodiments, it can be secured by a fastener, such as a clip to a loop, a bolt, or any other attaching technique.

Figure 4:
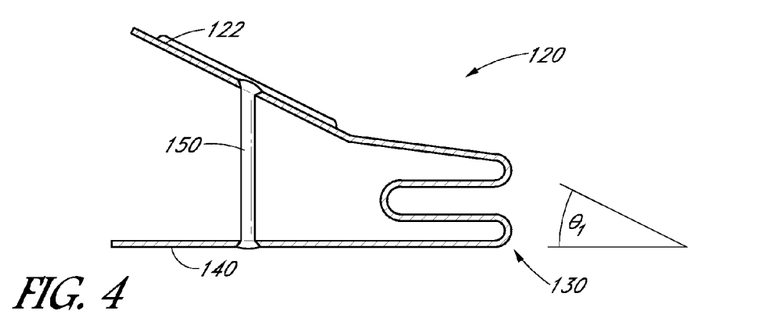
FIG. 4 is a cross-sectional side view of an embodiment of a wind deflector in a first state.
Figure 5:
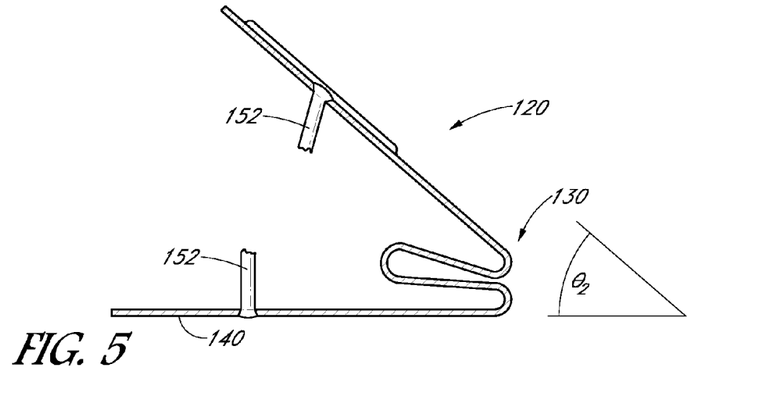
FIG. 5 is a cross-sectional side view of the wind deflector embodiment of FIG. 4 in a second state.
Figure 6:
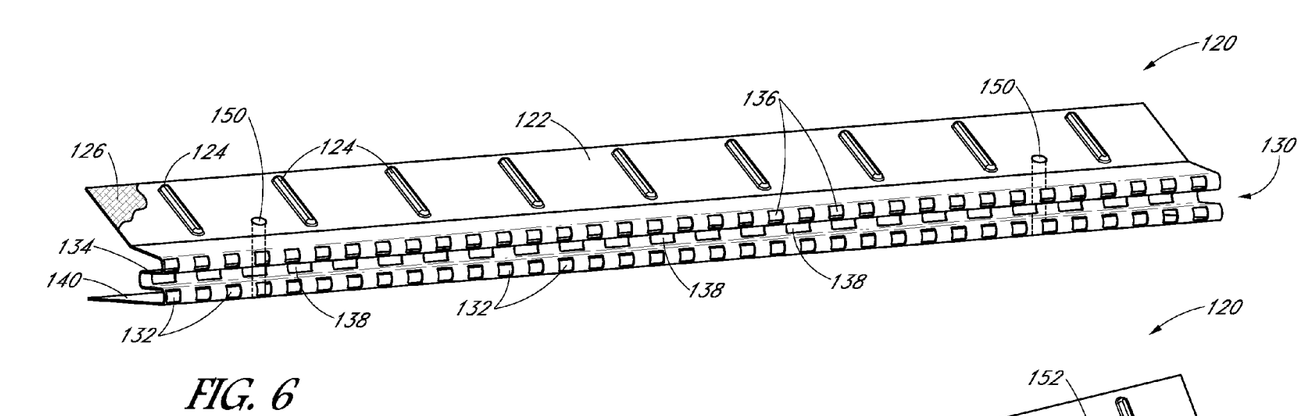
FIG. 6 is a front perspective view of an embodiment of a wind deflector in a first configuration.
Figure 7:
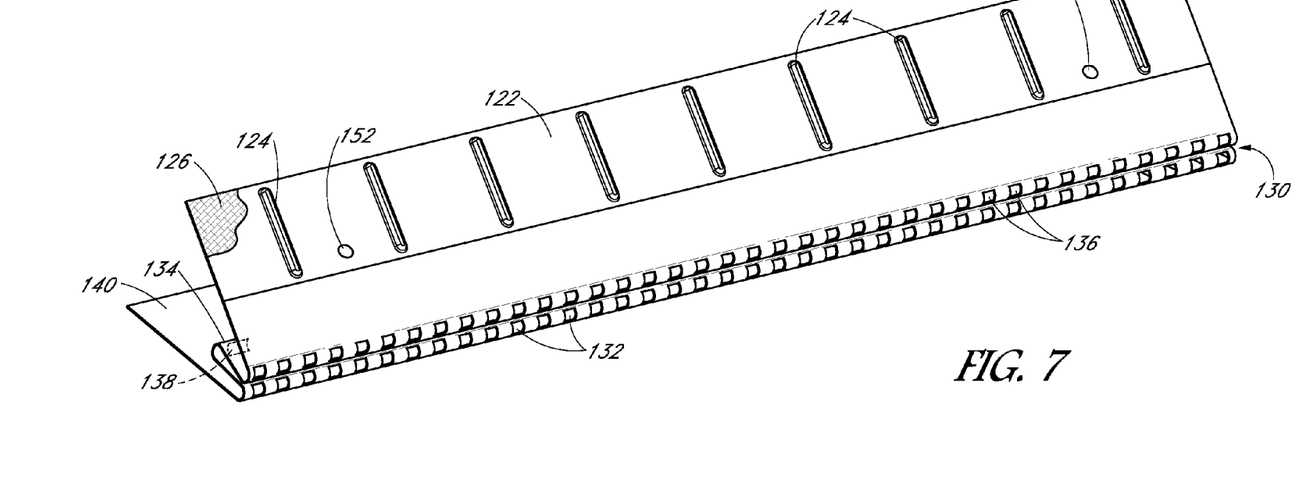
FIG. 7 is a front perspective view of an the wind deflector embodiment of FIG. 6 in a second configuration.

The heat fuse 150 can be used to adjust the position of the wind deflector 120 from a first state or configuration to a second state or configuration. FIGS. 4 and 6 illustrate the wind deflector 120 in the first state. FIGS. 5 and 7 illustrate the wind deflector 120 in the second state.

In the first state, the deflection surface 122 is angled to direct airflow over the top surface of the PV array 110 or adjacent PV modules. As shown in FIG. 4, the angle formed between the deflection surface 122 and the bottom portion 140 can be measured as $\theta_1$. Thus in the state measured by $\theta_1$, the heat fuse 150 is intact and has not been released. The first state can be the result of loading of the wind deflector 120 in an inward direction between the bottom portion 130 and the deflection surface 122. The compression portion 130 can undergo elastic strain, resulting in a bias to return to the unloaded state, the second state, shown in FIGS. 5 and 7. The wind deflector 120 can be retained in the first state by the heat fuse 150, which limits relaxation of the compression portion 130 by connecting the bottom portion 130 and deflection surface 122. This connection can inhibit expansion of the deflection surface 122 and bottom portion 130 away from each other, maintaining load in the wind deflector 120.

Figure 8:
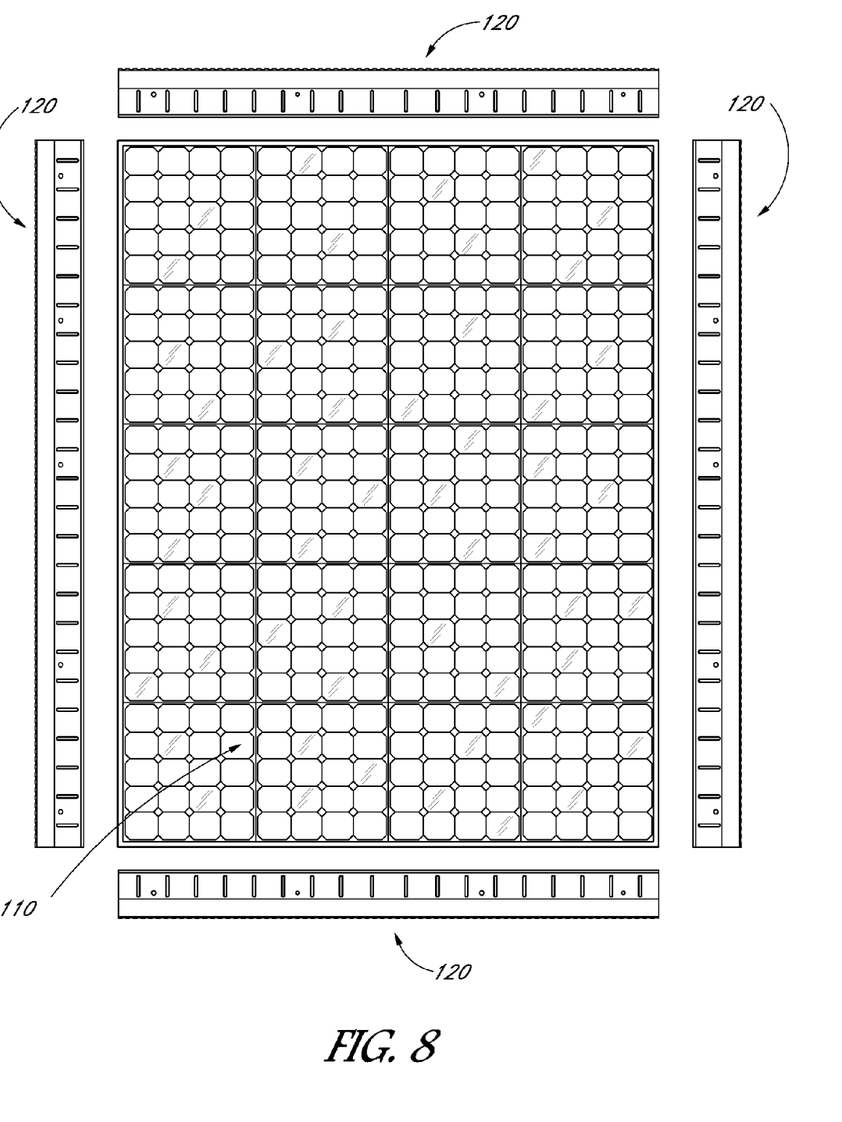
FIG. 8 is a top view of an arrangement of a wind deflector adjacent and surrounding a rooftop PV array.

In normal operation, the wind deflector 120 is installed, deployed, or positioned near or adjacent PV arrays in the first state. The wind deflector 120 can provide benefits related to wind redirection and pressure equalization to the PV array in the first state or configuration. The wind deflector can be disposed in any of several arrangements, including extending only partially along a single side of a PV array, extending entirely along a single side of the PV array, extending partially or entirely along any of several sides of the PV array, or surrounding the entire PV array, as shown in FIG. 8. On flat roofs, it may be advantageous to surround the PV array, or to position it on a side of prevailing wind or from which fire is expected to travel.

The deflection surface 122 can be positioned at an angle relative to the roof 102. In the first position of the wind deflector 120, the deflection surface 122 can, in some embodiments, extend to a height above the roof 102 sufficient to angle airflow approaching the deflector above the adjacent PV module 112. The PV module 112 can be one of several comprising the PV array 110. In the second position of the wind deflector 120, the deflection surface 122 can increase its angle relative to the roof 102, and additionally elevate the deflection surface 122.

In case of fire near the wind deflector, the heat from the fire will reach the trigger temperature. This may be because the wind deflector is positioned downslope from the PV array on a sloped roof or on all sides of a perimeter of the PV array. Upon reaching the trigger temperature, the heat fuse 150 can release, fail, or otherwise activate to change the configuration of the wind deflector 120 to the second state.

In the second state, the heat fuse 150 has been released and is shown in FIG. 5 as broken fuse parts 152. In those embodiments of the heat fuse 150 where structural failure is not the release mechanism, the broken fuse parts 152 maybe be embodied as discharged or released fuse components.

The angle $\theta_2$ illustrates the angle between the deflection surface 122 and bottom portion 130 in the second state. In some embodiments, angle $\theta_2$ is larger than $\theta_1$, caused by relaxation of the compression in the compression portion 130. In some embodiments, despite release by the heat fuse 150 and transition to the second state or position, the angle $\theta_2$ can be equal or nearly equal to $\theta_1$. Nonetheless, the deflection surface 122 can be elevated by expansion of the compression portion 130, thereby offering increased resistance to lateral spread of flames across the wind deflector 120.

The increased vertical height of the deflection surface 122, composed of or comprising a fire-resistant or heat-insulating material imposes a larger barrier to the spread of fire over or across the wind deflector 120 as compared to the first state.

Moreover, FIG. 6 illustrates the airflow vents 132 as seen from the front of the wind deflector 120 in a first orientation or profile corresponding to the first state of the wind deflector 120. FIG. 7 illustrates the airflow vents 132 in a second orientation or profile corresponding to the second state of the wind deflector 120. In some embodiments, the profile, or exposure of the airflow vents 132 to wind approaching the front of the wind deflector 120 is reduced in the second state. As a result of release of load in the compression portion 130, the orientation of the surfaces having the airflow vents 132 can move to a more horizontal position, reducing airflow through the vents 132. For example, the first row of vents 136 are only partially exposed to the front of the wind deflector 120, while the vent openings 138 on the recessed lobe 134 are at least partially occluded by the front of the wind deflector 120, including the front portion of the deflection surface 122, which has been shifted forward and downward. From the perspective of flow of air impinging on the front of the wind deflector 120, the transmission through the airflow vents 132 is reduced as a result of changing to the second state. Thus, the second profile of airflow vents 132, in the second state, can admit less air than the first profile of the airflow vents 132, in the first state.

By transmitting less air through the ventilated portion of the wind deflector 120 in the second state, the adjustment of the airflow vents 132 to a reduced profile inhibits, reduces, and/or minimizes both the flow of hot gases under the associated PV array and spread of fire or flames through the airflow vents 132.

FIGS. 9-12 illustrate several embodiments of wind deflectors positioned or deployed near to, or in connection with, rooftop PV arrays. Each embodiment can be combined with any of the other embodiments or features described above as desired for the installation or use with a PV array. Unless otherwise noted, the numerical indicators associated with components are similar to those associated with components in FIGS. 1-8, except that they have been incremented by 100.

FIG. 9 illustrates a wind deflector 220 adjacent and downwind to a PV array 210. The PV array 210 is a plurality of PV modules 212 coupled together at, and supported by rail assemblies 214, although they can be mounted on or to the roof 202 using any desired technique or mechanism. The wind deflector 220 can be positioned adjacent the PV array 210 and secured to the roof 202 using fasteners 280, including U-bolts, clips, and similar attachment devices or mechanisms.

The wind deflector 220 can be positioned such that upper air 290 can be deflected above the PV modules 212 by the deflection surface 222, and lower air 292 admitted beneath the PV modules 212, between the modules 212 and roof 202, by passing through the compression portion 230.

Figure 10:
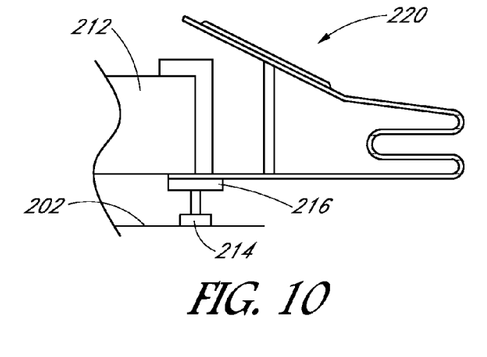
FIG. 10 is a side view of another embodiment of a wind deflector coupled to a rooftop PV array.

FIG. 10 illustrates an embodiment wherein the wind deflector 220 is coupled to a rail 216 of a rail assembly 214 supporting the modules 212. The coupling can be accomplished using a fastener, interference fit, or any desired technique.

Figure 11:
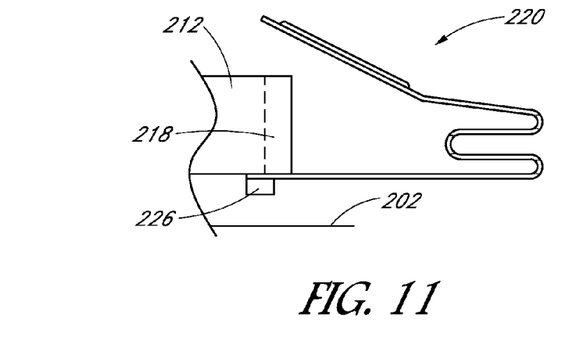
FIG. 11 is a side view of an embodiment of a wind deflector coupled to a rooftop PV module.

FIG. 11 illustrates an embodiment wherein the wind deflector 220 is coupled to the frame 218 of a PV module 212 by a fastener 226 or other mechanism, including adhesives, bonds, or clamping. Any desired technique to position the wind deflector 220 in a desired location.

Figure 12:
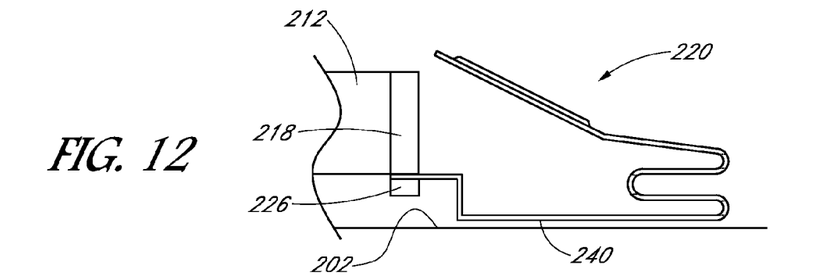
FIG. 12 is a side view of another embodiment of a wind deflector coupled to a rooftop PV module.

FIG. 12 illustrates an alternative embodiment of wind deflector 220 coupled in a manner similar to that of FIG. 11. Unlike FIG. 11, however, the bottom portion 240 is extended and shaped such that it extends downward from the frame 218 toward the surface of the roof 202 prior to extending along the roof 202. A similar embodiment can be used in an embodiment coupled to a rail 216, as shown in the coupling of FIG. 10.

Figure 13:
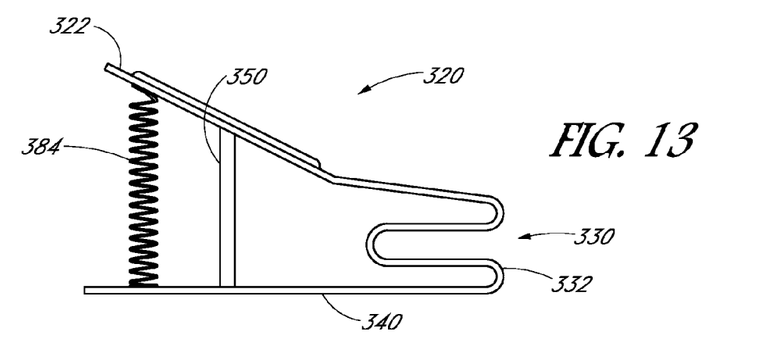
FIG. 13 is a side view of another embodiment of a wind deflector.

FIG. 13 illustrates an alternative embodiment of the wind deflector 320. Unless otherwise noted, the numerical indicators associated with components are similar to those associated with components in FIGS. 1-8, except that they have been incremented by 200.

Unlike previously-described embodiments, the wind deflector 320 is not loaded or in a compressed state in the first state. Thus, the ventilation portion 330 is not held in compression in the first state. Instead, a compression spring 384 is coupled to the bottom portion 340 and deflection surface 322. The compression spring 384 is in a compressed, loaded state in the first state of the wind deflector 320. The load is maintained in the compression spring 384 by the heat fuse 350, which inhibits separation of the bottom portion 340 and deflection surface 322.

The compression spring 384 can be covered in a housing to protect it from environmental effects. Several springs can be used along the length of the wind deflector 320, spread evenly along the length or at irregular intervals.

Figure 14:
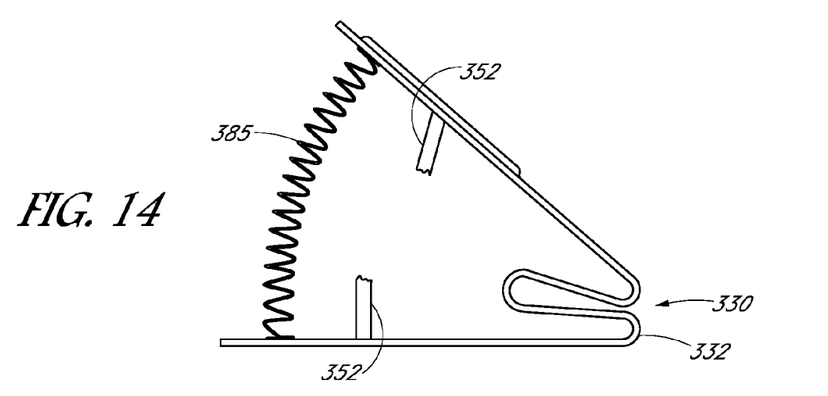
FIG. 14 is a side view of the embodiment of a wind deflector of FIG. 13 in a second state.

FIG. 14 illustrates the embodiment of FIG. 13 in the second state of the wind deflector 320. The heat fuse 350 has released into heat fuse parts 352, and the compression spring 385 has unloaded, imparting an outward force on the deflection surface 320 and bottom portion 340, thereby elevating the deflection surface 320 and adjusting the profile of airflow vents 332 in the ventilation portion 330.

Figure 15:
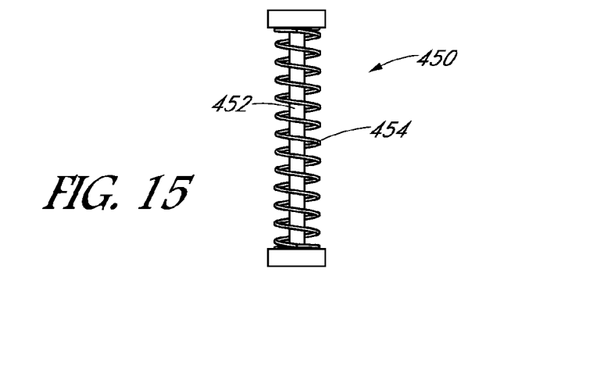
FIG. 15 is an embodiment of a combined fuse and compression device.

FIG. 15 illustrates an alternative embodiment of a heat fuse 450, wherein the compression spring 454 is positioned around the united heat fuse parts 452. The combined spring-heat fuse 450 can be used in embodiments, such as those shown in FIGS. 13 and 14, where a compression member, including a compression spring, is used to adjust the state of the wind deflector from the first to second states.

Figure 16:
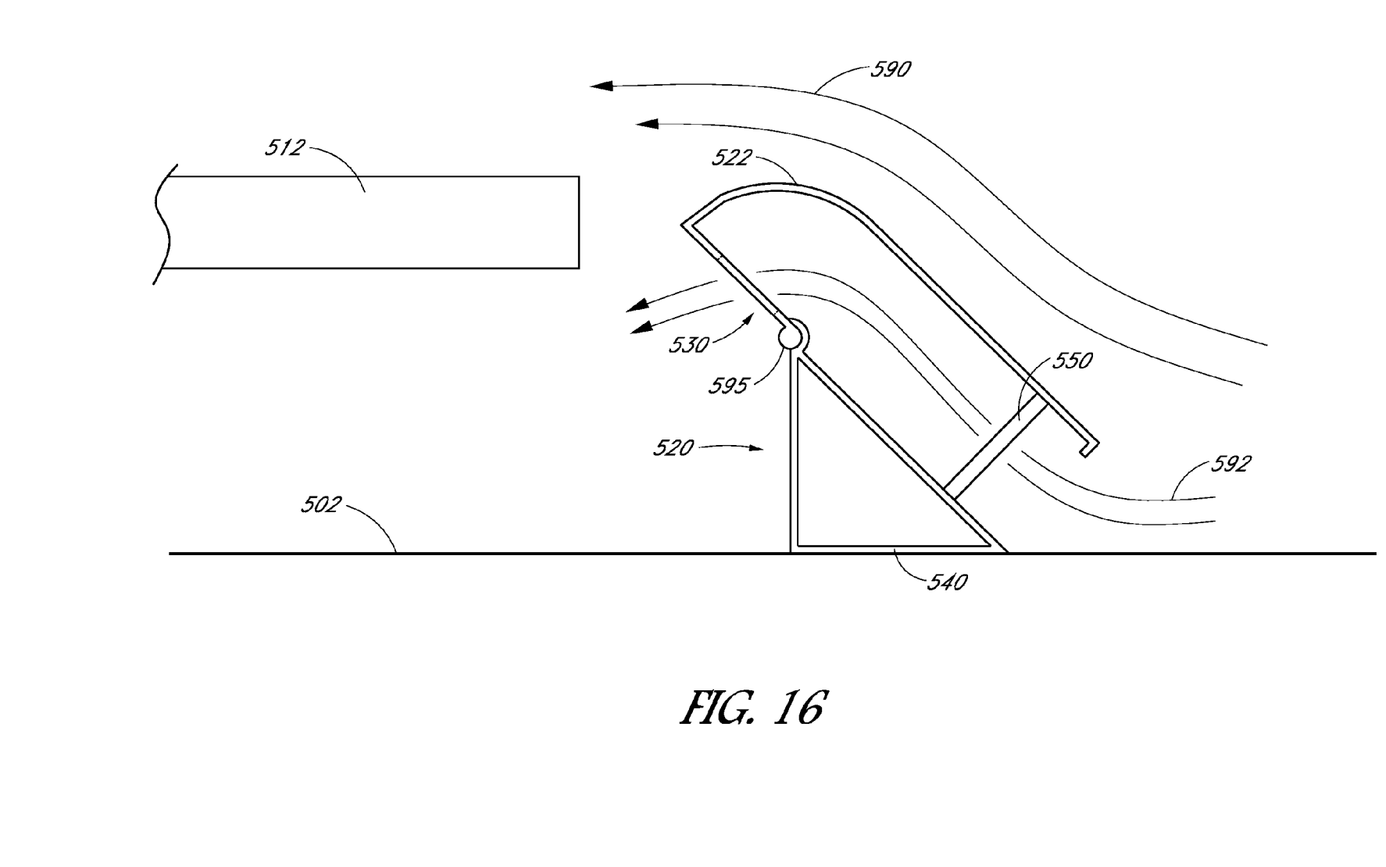
FIG. 16 is a side view of another embodiment of a wind deflector.
Figure 17:
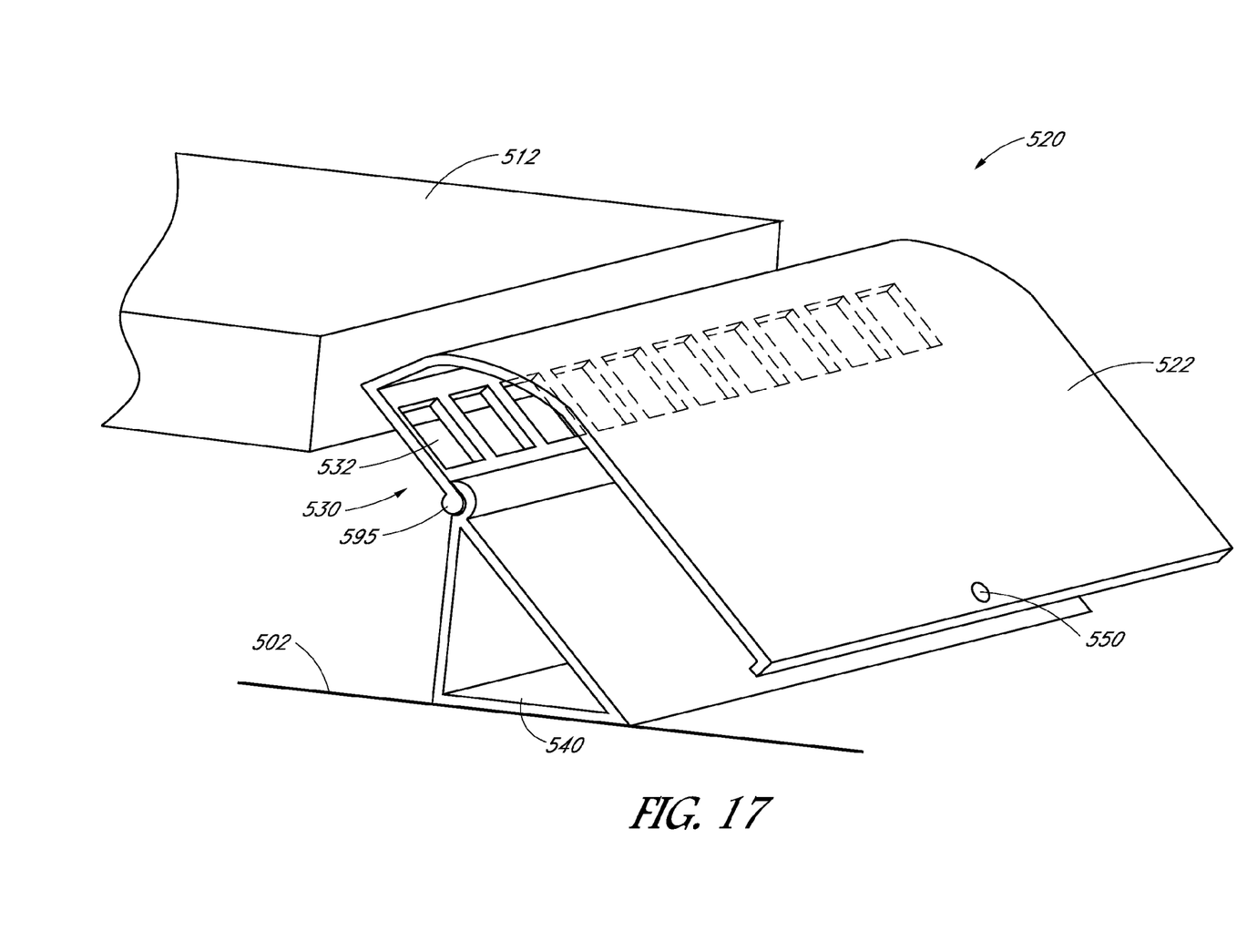
FIG. 17 is a perspective view of the embodiment of FIG. 16.
Figure 18:
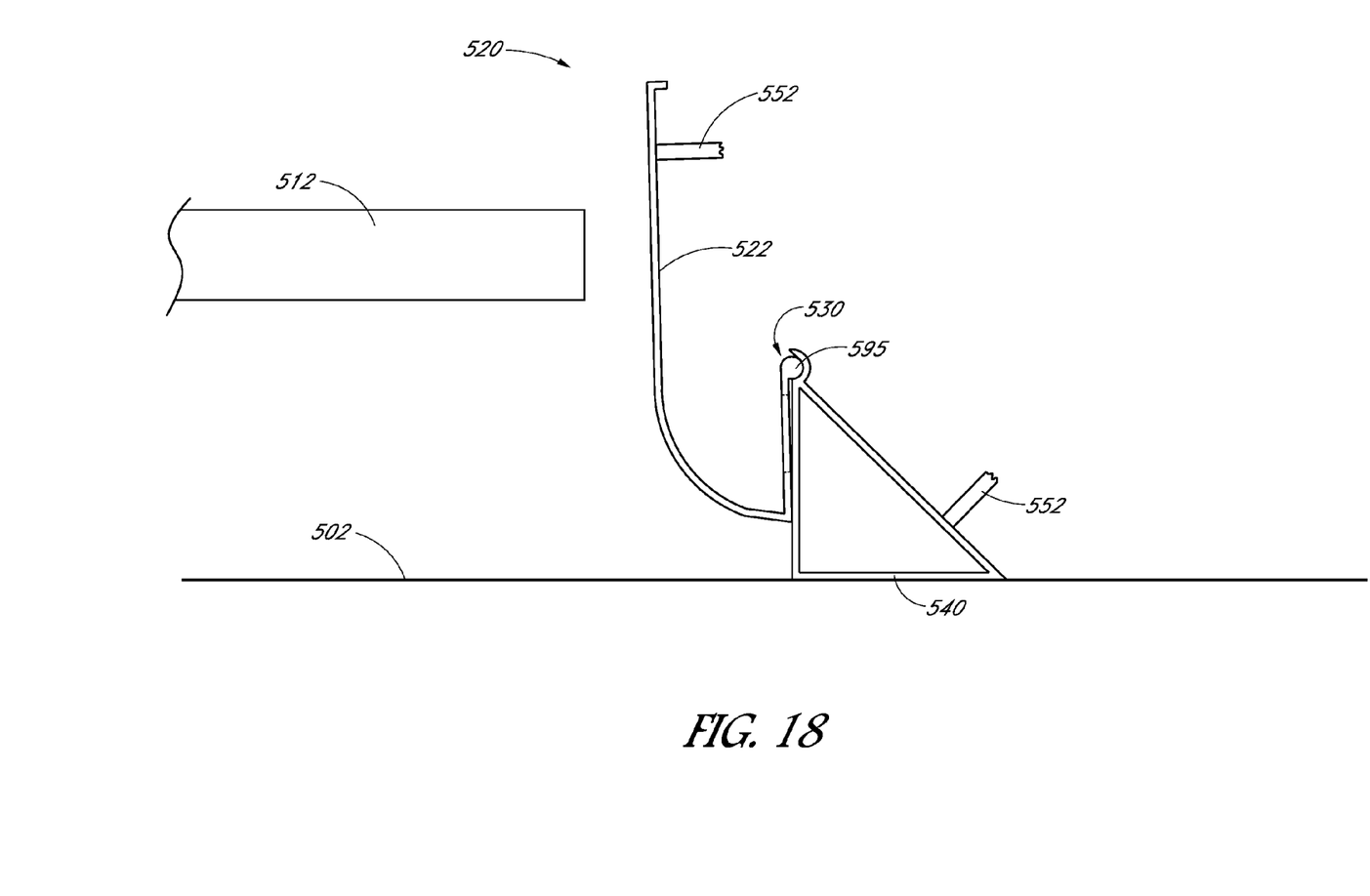
FIG. 18 is a side view of the embodiment of FIG. 16 in a second configuration.

FIGS. 16-18 illustrate another embodiment of a wind deflector 520. Each feature can be combined with any of the other embodiments or features described above as desired for the installation or use with a PV array. Unless otherwise noted, the numerical indicators associated with components are similar to those associated with components in FIGS. 1-8, except that they have been incremented by 400.

FIGS. 16 and 17 illustrate the wind deflector 520 in the first state or first configuration. FIG. 16 illustrates a side view of the wind deflector 520 positioned upwind from a PV module 512. In the illustrated embodiment, the deflection surface 522 is a curved portion open to air on its leading edge. The deflection surface 522 can be entirely curved, partially planar, entirely planar, or any combination thereof. The deflection surface 522 can have a lip, edge, or flange 523 extending from the end of the deflection surface 522, as shown. The scale and proportion are presented for clarity and may vary between embodiments.

The deflection surface 522 can be coupled with or integrally formed as a single part with the ventilation portion 530. In the illustrated embodiment, the deflection surface 522 and ventilation portion 530 are a single unit, while in other embodiments, they can be several. The ventilation portion 530 can have airflow vents 532 positioned to permit air to flow therethrough. The size, geometric shape, and spacing of the airflow vents 532 can vary between embodiments.

The ventilation portion 530 can be hingedly, pivotally or rotateably connected or coupled to the bottom portion 540. This coupling can permit the ventilation portion 530 and deflection surface 522 to rotate to the second configuration shown in FIG. 18 and described in greater detail below. The bottom portion 540 is shown having a triangular configuration, though any desired support arrangement can be used, such as a rectangular cross-section, open-sided square cross-section, with the front surface omitted, and so on, without limitation.

The bottom portion 540 can support the ventilation portion 530 at a sufficiently high position from the roof 502 such that the rotation of the deflection surface 522 does not cause the deflection surface 522 to strike the roof 502. The bottom portion 540 can have no airflow vents or openings. Accordingly, lower air 592 impinging on the bottom portion 540 can be directed up along the surface of the bottom portion 540 and through the airflow vents 532. The airflow vents 532 can be positioned to permit the air to flow under the adjacent, downwind PV module 512. The flow beneath the PV module 512 can decrease module operating temperature, improving performance over a design omitting airflow vents 532 in the ventilation portion 530. The upper air 590 is directed above the PV module 512 by the deflection surface 522.

The ventilation portion 530 and deflection surface 522 are retained in the first position by the heat fuse 550. The heat fuse 550 can be positioned along the leading edge of the wind deflector 520, toward the edge of expected fire approach. In this way, the heat fuse 550 can activate as a result of approach of fire.

For descriptive purposes, the ventilation portion 530 and deflection surface 522 are collectively referred to as the "upper portion" in reference to the embodiment of FIGS. 16-18. The upper portion is maintained in the first position by the heat fuse 550. The upper portion can rotate or pivot between the first position shown in FIGS. 16 and 17 and the section position shown in FIG. 18 at a joint 595. The joint 595 can be a bearing, pinned connection, a hinge, co-axial sleeves, or any other assembly sufficient to perform the described features. The joint 595 in the first position can optionally include a compressed torsional spring. Other biasing elements can also be used, such as an elastomeric item. In one embodiment, a compressed linear spring can be positioned between an upper surface of the bottom portion 540 and the underside of the deflection surface 522. The linear spring, once released by activation of the heat fuse 550, can expand and move the upper portion to the second position, as described below. The bias or direction of exertion is directed to rotate the upper portion counterclockwise, into the second position. Thus, like the compression of the ventilation portion described in relation to the above embodiments, the biasing element is counteracted by the heat fuse 550.

FIG. 18 illustrates the wind deflector 520 in the second position after release of the heat fuse 550 into heat fuse parts 552. The joint 595, whether acting on a force imparted by another biasing member or an integral element, such as a torsional spring, permits the rotation of the upper portion to the second position as shown. In the second position, the airflow vents 532 are occluded, and the deflection surface 522 is positioned to inhibit the spread of flames across the wind deflector 520. In some embodiments, the upper portion can be weighted or counterweighted such that it will rotate to the second position upon release or activation of the heat fuse 550 without a force exerted by a biasing element, such as a spring.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A wind deflector assembly for a photovoltaic solar system installed on a rooftop, the wind deflector assembly comprising:
    a planar portion oriented at an angle to a slope of the rooftop;
    a support portion beneath the planar portion; and
    a compression portion coupled between the planar portion and the support portion, the compression portion retained in a strain-loaded position, the compression portion disposed between the planar portion and the support portion, the compression portion comprising a plurality of openings.

2. The wind deflector assembly of claim 1, further comprising a fuse maintaining the compression portion in the strain-loaded position.

3. The wind deflector assembly of claim 2, wherein the compression portion is adapted to release to an un-loaded position upon release of the fuse.

4. The wind deflector assembly of claim 3, wherein the compression portion is adapted to adjust the angle of the planar portion relative to the slope of the rooftop upon release of the fuse.

5. The wind deflector assembly of claim 1, wherein the plurality of openings have a first profile when the compression portion is in the strain-loaded position, and to have a second profile when the compression portion is in the un-loaded position, and wherein the second profile has a reduced airflow as compared to the first profile.

6. The wind deflector assembly of claim 1, wherein the planar portion, support portion, and compression portion are integrally formed as a single piece.

7. The wind deflector assembly of claim 6, wherein the single piece comprises shaped flashing material.

8. The wind deflector assembly of claim 7, wherein the planar portion has a fire-resistant coating.

9. A rooftop photovoltaic solar system comprising:
- an array of photovoltaic modules on a roof, the array having at least one edge, the array comprising at least a first photovoltaic module, each photovoltaic module of the array comprising a frame about a perimeter of the photovoltaic module, wherein each photovoltaic module of the array is disposed generally parallel to the roof;
- an edge member mechanically connected to a first outer edge of the frame of the first photovoltaic module by way of a first fastener, the first outer edge disposed along the at least one edge of the array, wherein a connection between the edge member and the first outer edge of the frame is at a bottom portion of the frame at a location on the frame that is below a top surface of the first photovoltaic module;
- a second edge member mechanically connected to a second outer edge of the frame of the first photovoltaic module, the second outer edge of the frame disposed transverse to the first outer edge of the frame, wherein a second connection between the second edge member and the second outer edge of the frame is at a location on the frame that is below the top surface of the first photovoltaic module; and
- a rail mounted to the roof by way of a member extending between the rail and the roof, the array mounted to the rail, wherein the rail extends completely across and underneath a plurality of photovoltaic modules, wherein the first photovoltaic module is connected to the rail by a second fastener, the first fastener different from the second fastener,
- wherein the edge member extends downwardly from the frame towards the roof such that a distal end of the edge member extends below the frame, and wherein the edge member extends completely across the plurality of photovoltaic modules, the plurality of photovoltaic modules wherein the connection between the edge member and the first outer edge of the frame is underneath the frame and the first photovoltaic modules; and comprising the first photovoltaic module.

10. The rooftop photovoltaic solar system of claim 9, wherein the edge member is angled relative to the frame such that the edge member extends away from the first photovoltaic module.

11. The rooftop photovoltaic solar system of claim 9, further comprising a plurality of edge members, the edge members spanning multiple photovoltaic modules.

12. The rooftop photovoltaic solar system of claim 11, wherein the array is substantially surrounded by the plurality of edge members.

13. The rooftop photovoltaic solar system of claim 9, wherein the edge member comprises a wind deflector.

14. The rooftop photovoltaic solar system of claim 9, wherein the edge member is mechanically connected to the frame by a clip.

15. The rooftop photovoltaic solar system of claim 9, wherein the first photovoltaic module is spaced from the roof by a gap, the edge member extending across substantially the entire gap.

16. A wind deflector held in compression, the wind deflector comprising:
- a planar portion;
- a support portion coupled to the planar portion, the planar portion held in a first position relative to the support portion, the first position causing strain in the wind deflector; and
- a surface between the planar portion and the support portion, the surface comprising a plurality of openings, the surface comprising a compression portion, the compression portion retained in a strain-loaded position in the first position.

17. The wind deflector of claim 16, wherein the wind deflector comprises a fire-resistant coating.

18. The wind deflector of claim 16, further comprising fuse means retaining the wind deflector in the first position, the fuse means adapted to release at a predetermined temperature, thereby releasing the wind deflector from compression and positioning the planar portion at a second position relative to the support portion.

19. The rooftop photovoltaic solar system of claim 9, further comprising a gap between an uppermost surface of the frame and a top surface of the edge member.

20. The rooftop photovoltaic solar system of claim 9, wherein the edge member extends across an entire width of the array.

* * * * *